United States Patent
Filippi et al.

(10) Patent No.: US 7,153,344 B2
(45) Date of Patent: Dec. 26, 2006

(54) PROCESS FOR THE PREPARATION AND RECOVERY OF CARBON DIOXIDE FROM WASTE GAS OR FUMES PRODUCED BY COMBUSTIBLE OXIDATION

(75) Inventors: Ermanno Filippi, Castagnola (CH); Federico Zardi, Breganzona (CH)

(73) Assignee: Ammonia Casale S.A. (CH)

( * ) Notice: Subject to any disclaimer, the term of this patent is extended or adjusted under 35 U.S.C. 154(b) by 41 days.

(21) Appl. No.: 10/474,573

(22) PCT Filed: Mar. 22, 2002

(86) PCT No.: PCT/EP02/03243

§ 371 (c)(1),
(2), (4) Date: Oct. 10, 2003

(87) PCT Pub. No.: WO02/083272

PCT Pub. Date: Oct. 24, 2002

(65) Prior Publication Data

US 2004/0123737 A1 Jul. 1, 2004

(30) Foreign Application Priority Data

Apr. 11, 2001 (EP) .................................. 01109028

(51) Int. Cl.
*B01D 53/02* (2006.01)

(52) U.S. Cl. .................. 95/51; 95/99; 95/106; 95/123; 95/139

(58) Field of Classification Search .................... 95/51, 95/99, 106, 115–120, 123, 126, 138, 139
See application file for complete search history.

(56) References Cited

U.S. PATENT DOCUMENTS

| | | | | |
|---|---|---|---|---|
| 3,078,638 A | * | 2/1963 | Milton | 95/139 |
| 3,078,639 A | * | 2/1963 | Milton | 95/139 |
| 3,619,130 A | * | 11/1971 | Ventriglio er al. | 95/115 |
| 3,751,878 A | * | 8/1973 | Collins | 95/105 |
| 4,249,915 A | * | 2/1981 | Sircar et al. | 95/99 |
| 4,581,044 A | * | 4/1986 | Uno et al. | 95/96 |
| 4,726,815 A | * | 2/1988 | Hashimoto et al. | 95/41 |
| 4,761,167 A | * | 8/1988 | Nicholas et al. | 62/626 |
| 4,813,980 A | * | 3/1989 | Sircar | 95/101 |
| 4,963,339 A | * | 10/1990 | Krishnamurthy et al. | 423/437.2 |
| 5,100,635 A | * | 3/1992 | Krishnamurthy et al. | 423/235 |
| 5,424,051 A | * | 6/1995 | Nagji et al. | 423/234 |

(Continued)

FOREIGN PATENT DOCUMENTS

DE    104 915 A    4/1974

(Continued)

*Primary Examiner*—Robert A. Hopkins
(74) *Attorney, Agent, or Firm*—Akerman Senterfitt

(57) ABSTRACT

A process for the separation and recovery of carbon dioxide from waste gases produced by combustible oxidation is described comprising the steps of feeding a flow of waste gas to a gas semipermeable material, separating a gaseous flow comprising high concentrated carbon dioxide from said flow of waste gas through the gas semipermeable material, and employing at least a portion of the gaseous flow comprising high concentrated carbon dioxide as feed raw material in an industrial production plant and/or stockpiling at least a portion of the gaseous flow comprising carbon dioxide.

5 Claims, 1 Drawing Sheet

U.S. PATENT DOCUMENTS

| | | | |
|---|---|---|---|
| 5,531,808 A * | 7/1996 | Ojo et al. | 95/96 |
| 5,587,003 A * | 12/1996 | Bulow et al. | 95/123 |
| 5,614,000 A * | 3/1997 | Kalbassi et al. | 95/96 |
| 5,728,198 A * | 3/1998 | Acharya et al. | 95/114 |
| 5,846,295 A * | 12/1998 | Kalbassi et al. | 95/105 |
| 5,855,650 A * | 1/1999 | Kalbassi et al. | 95/106 |
| 5,917,136 A * | 6/1999 | Gaffney et al. | 95/98 |
| 5,938,819 A * | 8/1999 | Seery | 95/104 |
| 5,980,611 A * | 11/1999 | Kumar et al. | 95/101 |
| 6,015,450 A * | 1/2000 | Joshi et al. | 95/139 |
| 6,024,781 A * | 2/2000 | Bulow et al. | 95/101 |
| 6,027,549 A * | 2/2000 | Golden et al. | 95/98 |
| 6,245,127 B1 * | 6/2001 | Kane et al. | 95/101 |
| 6,270,557 B1 * | 8/2001 | Millet et al. | 95/96 |
| 6,273,939 B1 * | 8/2001 | Millet et al. | 95/106 |
| 6,309,445 B1 * | 10/2001 | Gittleman et al. | 95/96 |
| 6,379,430 B1 * | 4/2002 | Monereau | 95/96 |
| 6,506,236 B1 * | 1/2003 | Golden et al. | 95/129 |
| 6,596,248 B1 * | 7/2003 | Schimkat et al. | 423/220 |
| 6,755,892 B1 * | 6/2004 | Nalette et al. | 95/11 |

FOREIGN PATENT DOCUMENTS

| | | |
|---|---|---|
| EP | 0178833 A2 * | 4/1986 |
| EP | 0367618 A1 * | 5/1990 |
| EP | 0 484 121 A1 | 5/1992 |
| EP | 0992274 A1 | 4/2000 |
| EP | 1 078 674 A3 | 2/2001 |
| SU | 251 679 A | 9/1969 |
| SU | 1 068 140 A | 1/1984 |
| SU | 1 411 031 A1 | 7/1988 |
| SU | 1 600 784 A1 | 10/1990 |

* cited by examiner

US 7,153,344 B2

PROCESS FOR THE PREPARATION AND RECOVERY OF CARBON DIOXIDE FROM WASTE GAS OR FUMES PRODUCED BY COMBUSTIBLE OXIDATION

FIELD OF APPLICATION

In its most general aspect, the present invention relates to a process for the separation and recovery of carbon dioxide from waste gas or fumes produced by combustible oxidation.

In particular, the present invention relates to a process for the separation and recovery of carbon dioxide from exhaust gases or fumes produced by the oxidation of fossil fuels or fractions and derivatives thereof with air.

The term "oxidation" is meant to comprise both the normal combustion of fuels, particularly fossil fuels, with air, carried out on a domestic or industrial scale, and the electrochemical oxidation thereof, occurring, for example, in the fuel cells.

PRIOR ART

It is well known that exhaust (waste) gases or fumes produced by the combustion or by other oxidative processes of fossil fuels (combustible) in industrial or domestic plants, are dispersed in the atmosphere causing various environmental impact problems. The most severe of such problems relates to the overall heating of the planet, known as "greenhouse effect" for which the carbon dioxide contained in said exhaust gases or fumes is responsible.

Furthermore, it is known that carbon dioxide is a feed raw material in several industrial processes; for carrying out such processes, the thermal energy produced by the combustion of fossil fuels is usually employed. For these processes, therefore, it could be convenient to separate and recover at least part of the carbon dioxide from the combustion exhaust gases, in order to increase the production capacity and/or to reduce the purchasing costs of this raw material.

For example, in the processes for the production of ammonia and urea or methanol, it is known that the feed raw materials such as hydrogen, carbon monoxide and carbon dioxide are generally obtained in the form of a gaseous mixture through the reforming of methane or other light hydrocarbons such as natural gas, LPG (liquefied petroleum gas), naphtha.

The methane conversion is carried out in a dedicated furnace of a reforming plant, usually associated to the that used for the production of ammonia and urea or methanol, exploiting the thermal energy produced by the combustion of a part of the feed methane with air.

Within the production process of ammonia and urea, nitrogen is then added in stoichiometric amount to the gaseous mixture obtained through the reforming, in order to convert hydrogen into ammonia.

However, in this way, the amount of carbon dioxide contained in the aforesaid gaseous mixture is smaller than the stoichiometric amount required to convert into urea all the ammonia produced, so that the urea production plant capacity is disadvantageously reduced.

Instead, in the methanol production process, it is the hydrogen of the gaseous mixture obtained through the reforming that is in excess with respect to the amount necessary for converting all the carbon monoxide and carbon dioxide into methanol and therefore part of it is purged from the synthesis reactor and often used as fuel.

In the above mentioned two processes, hence, it is clear that the production capacity of urea and methanol, respectively, could be significantly increased, should it be possible to recover even only part of the carbon dioxide contained in the combustion gases of the methane reforming plant.

Therefore, the problem regarding the separation and recovery of carbon dioxide from the combustion gases or fumes is quite felt and in the last decades has been the subject of several studies.

The larger part of these studies was directed to the so-called "wet" separation and recovery processes of carbon dioxide. That is to say, processes based upon the scrubbing of the combustion gases with suitable solutions or solvents able to adsorb selectively carbon dioxide and the recovery of the adsorbed carbon dioxide through heating of the adsorbing solution or solvent.

Various processes of the aforesaid type have been developed in the prior art; however, they suffer of various drawbacks that limit their industrial applicability.

One of the drawbacks, which are more often encountered lies in the fact that the scrubbing solution is subjected to oxidation phenomena of its components, which phenomena are due to the presence of oxygen in the combustion gases, and therefore requires a frequent replacement.

Furthermore, it shall be noted that the combustion gases usually contain also sulphur and nitric oxides (SOx and NOx), that react with some components of the scrubbing solution, creating stable salts and other harmful compounds of difficult removal and disposal.

Hence, the need of frequently replacing the scrubbing solution as well the removal and disposal of the harmful compounds deriving from its degradation imply relevant operating costs for the aforesaid known processes of gaseous carbon dioxide separation and recovery.

Furthermore, the equipment required for implementing the carbon dioxide separation and recovery processes of the prior art are complicated, expensive, difficult to be operated and have a large size, and therefore high investment and maintenance costs are also implied.

The technical problem underlying the present invention is that of providing a process for the separation and recovery of carbon dioxide from waste gases produced by combustible oxidation that is simple and cost-effective to be carried out, and does not exhibit the previously described drawbacks with reference to the carbon dioxide separation and recovery processes of the prior art.

SUMMARY OF THE INVENTION

This technical problem is solved by a process for the separation and recovery of carbon dioxide from waste gases produced by combustible oxidation comprising the steps of:
  feeding a flow of waste gas to a gas semipermeable material,
  separating a gaseous flow comprising high concentrated carbon dioxide from said flow of waste gas through said gas semipermeable material, and
  employing at least a portion of said gaseous flow comprising high concentrated carbon dioxide as feed raw material in an industrial production plant and/or stockpiling at least a portion of said gaseous flow comprising carbon dioxide.

The gas semipermeable material can be chosen from the group comprising hollow fibre membranes and materials able to adsorb preferentially carbon dioxide, such as the molecular sieves.

The hollow fibre membranes can be of the type preferentially permeable to carbon dioxide or of the type substantially non-permeable to this gas.

The term "molecular sieves" is meant to comprise all those conventional materials having micropores adapted to adsorb preferentially the carbon dioxide contained in a gaseous mixture, including activated carbon. According to the specific way the carbon dioxide is adsorbed and released, these materials are classified as molecular sieves or activated carbons of the PSA (pressure swing adsorption) or TSA (temperature swing adsorption) type.

In the PSA adsorption process, the gas mixture containing carbon dioxide is made pass through the molecular sieve under pressure in such a way to promote the preferential adsorption of carbon dioxide in the micropores. Then, the pressure is reduced in such a way as to obtain a desorption of the carbon dioxide together with other gaseous components possibly retained therewith and accordingly regenerate the molecular sieve.

Differently, in the TSA method, the preferential adsorption of carbon dioxide into the micropores is carried out by letting the gaseous mixture containing carbon dioxide to be separated, pass through the above mentioned molecular sieve, at a temperature not higher than 80° C. Then the temperature is increased, for example with the aid of a vapour flow, in such a way as to obtain a desorption of the carbon dioxide together with other gaseous components possibly retained therewith and accordingly regenerate the molecular sieve.

Preferably, in the process according to the present invention at least a molecular sieve of the TSA type is used.

The use of molecular sieves of the TSA type in the process according to the invention does not require the compression of large amounts of gas to be separated and therefore is advantageous because of the resulting low energy costs.

Furthermore, in order to regenerate the molecular sieves of TPA type, it is enough to let a vapour flow or, alternatively, a portion of the gas flow comprising high concentrated carbon dioxide, pass through these sieves, wherein such portion of gas flow is suitably heated at the regeneration temperature of such sieves.

Otherwise, the use of hollow fibre membrane or molecular sieves of PSA type in the process according to the invention is less advantageous, if compared with the use of molecular sieves of TSA type, because of the relevant energy costs connected to the required compression of the exhaust gases to be treated.

Further on, the hollow fibre membranes are very expensive even if they guarantee a greater effectiveness and separation yield of the carbon dioxide from other gaseous components contained in the combustion exhaust gases.

According to a preferred embodiment of the present invention, the gas semipermeable material is able to adsorb preferentially carbon dioxide and the separation of the gaseous flow comprising high concentrated carbon dioxide from said waste gas flow comprises the steps of:
   letting a waste gas flow permeate into said gas semipermeable material in such a way as to adsorb at least a relevant portion of the carbon dioxide contained in said waste gas flow and obtain a permeated gas flow with a low carbon dioxide content,
   dispersing said permeated gas flow with low carbon dioxide content, and
   deabsorbing said at least one relevant portion of carbon dioxide from said gas semipermeable material, thus obtaining said gaseous flow comprising high concentrates of carbon dioxide.

The features and advantages of the process for the recovery of carbon dioxide from combustion exhaust gases according to the present invention will become clearer from the following description of an indicative and non-limiting example of implementation thereof, made with reference to the attached drawing.

DETAILED DESCRIPTION

Figure 1:
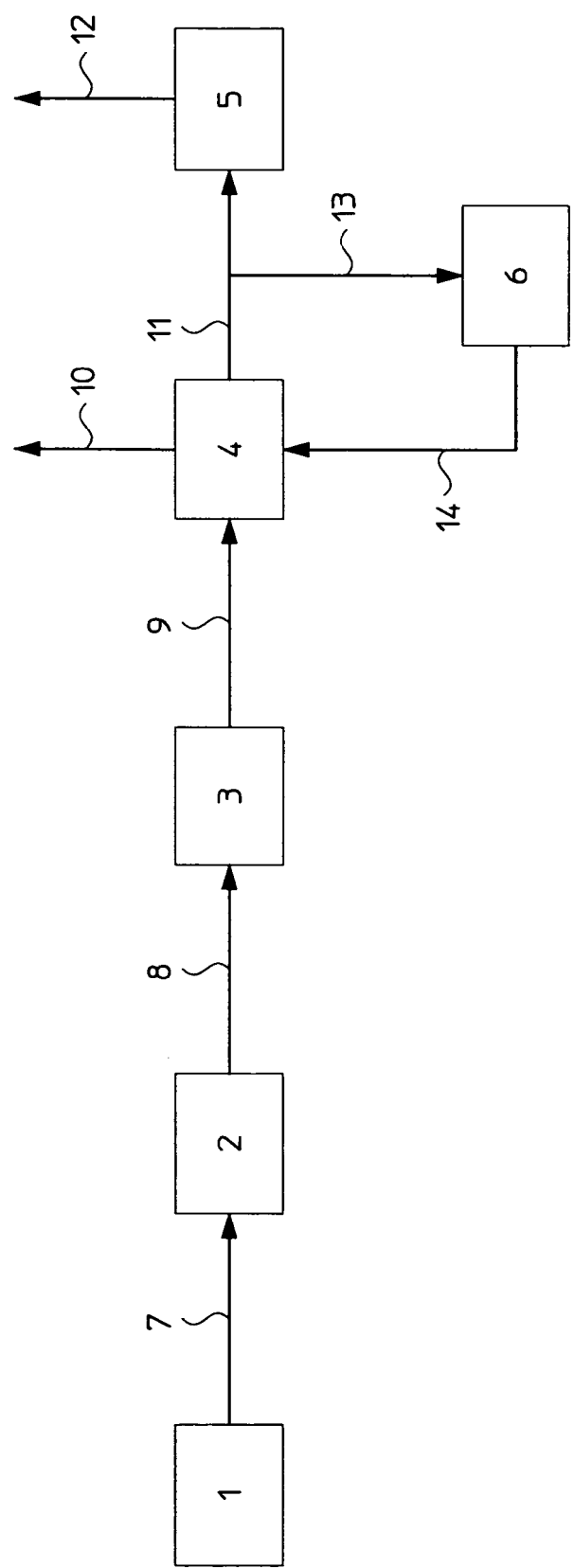
FIG. 1 shows a block diagram of an embodiment of implementation of the process for the separation and recovery of carbon dioxide from a combustion exhaust gas according to the present invention.

With reference to the annexed figure, block 1 refers to an equipment of a domestic or industrial plant for the combustion of a fuel, in particular a fossil fuel, with air.

Block 2 refers to a heat exchanger for cooling an exhaust gas flow at high temperature produced by the combustion within block 1.

The gaseous composition of this exhaust gas flow mainly comprises carbon dioxide, water, oxygen and nitrogen and, to a limited extent, nitric and sulphur oxides (SOx and NOx).

Block 3 refers to a compression unit adapted to compress up to a desired pressure the exhaust gas flow cooled within block 2. Such block 3 is optional and becomes particularly important when for the carbon dioxide separation PSA type molecular sieves or hollow fibre membranes are used, since it is necessary to suitably compress the exhaust gas to be treated.

If TSA type molecular sieves are used, the block 3 can be omitted or, alternatively, it may-consist of a simple fan.

Block 4 refers to a gas semipermeable material, such as a membrane or a molecular sieve, to separate the gaseous flow comprising high concentrated carbon dioxide from the exhaust gas flow coming from the block 2 or block 3 as it will be explained later on in the present description.

Block 5 refers to another compression unit adapted to compress a gas flow comprising high concentrated carbon dioxide coming from the block 4.

Block 6 refers to another heat exchanger adapted to heat a portion of gas flow comprising high concentrated carbon dioxide coming from the block 4.

The flow line 7 indicates an exhaust gas flow at high temperature produced by the combustion within block 1.

This exhaust gas flow is then fed to the block 2 where it is cooled down to a temperature comprised between 20° and 80° C.

The flow line 8 indicates the cooled gas flow coming from the block 3. If the gas semipermeable material of block 4 consists of a hollow fibre membrane or by a PSA type molecular sieve, the exhaust gas flow 8 is firstly compressed in the block 3 at a pressure comprised between 1 abs bar and 20 abs bar, and then fed, as indicated by the flow line 9, to the block 4.

On the contrary, if the gas semipermeable material of block 4 consists of a TSA type molecular sieve, block 3 may be omitted and therefore the exhaust gas flow 8 coming from the block 2 is directly fed to the block 4.

The gas semipermeable material of block 4 provides for the separation of a gas flow comprising high concentrated carbon dioxide from the exhaust gas flow 8 or 9.

Preferably, this material consists of a TSA type molecular sieve that allows the preferential passage of nitrogen, adsorbing at the same time the mixture gaseous components containing oxygen, i.e. mainly carbon dioxide, water and oxygen.

Therefore, as indicated by the flow line 10, at the outlet of the block 4 a gas flow is obtained comprising mainly nitrogen that is dispersed in the atmosphere.

In order to obtain a desorption of the, carbon dioxide and the other oxygenated compounds adsorbed in the block 4, an interruption of the exhaust gas flow 8 or 9 to the block 4 and a regeneration of the hollow fibre membrane or of the molecular sieve represented in the block 4 is provided.

In the case of a hollow fibre membrane or a molecular sieve of the PSA type, the regeneration is carried out by decreasing the pressure in the block 4 (decompression) in such a way as to separate the carbon dioxide adsorbed in such materials.

In the case of a TSA type molecular sieve, the regeneration is carried out in a manner that will be explained later on in the present description.

As indicated by flow line 11, from the regeneration step a gaseous flow is thus obtained, which turns out to have a carbon dioxide concentration higher than that in the exhaust gas flow 8 or 9. Also the concentration in the gaseous flow 11 of the other gaseous components adsorbed in the block 4 is higher than the concentration of these components in the exhaust gas flow 8 or 9.

Then, the gaseous flow 11 comprising high concentrated carbon dioxide can be used as a feed raw material in suitable industrial processes, directly or after having been further treated. Alternatively, the flow 11 can be liquefied or stockpiled in a suitable manner in order to be subsequently used according to specific needs.

For instance, the gaseous flow 11 can be compressed in block 5 to a suitable pressure, and the so obtained gaseous flow indicated by flow line 12 can be directly utilized as feed raw material in a plant for the production of urea or methanol.

Anyway, should the complete or partial removal from the flow 11 of gaseous components, such as oxygen and nitric or sulphur oxides (SOx, NOx) be necessary, then it is possible to arrange for the passage of the gaseous flow 11 under suitable operative conditions through one or more membranes or molecular sieves and/or for the treatment of the flow 11 with other types of separation systems.

In this case, the flow 11 completely or partially purified from the above mentioned gaseous components can be compressed in the block 5 and used in a plant for the urea of methanol production as a feed raw material.

In the present example, a flow portion 11 comprising high concentrated carbon dioxide, indicated by the flow line 13, is heated in block 6 and fed to block 4 through the flow line 14, in order to regenerate the TSA-type molecular sieve.

Alternatively, for the above-mentioned regeneration it is possible to use water steam at high temperature.

The regeneration implies the desorption of the gaseous components, and in particular of carbon dioxide retained into the micropores of the TSA-type molecular sieve, which are recovered in the flow 11.

Obviously a man skilled in the art can make a plurality of modifications to the process according to the invention in order to fulfill specific and peculiar requirements, all falling within the scope of protection of the invention as defined in the following claims.

The invention claimed is:

1. A process for the separation and recovery of carbon dioxide from waste gases produced by combustible oxidation comprising the steps of:
    producing a waste gas by combustible oxidation;
    feeding a flow of said waste gas to a gas semipermeable material that is a molecular sieve or activated carbon;
    separating a gaseous flow comprising high concentrated carbon dioxide from said flow of waste gas through said gas-semipermeable material;
    wherein adsorption in and desorption from said gas semipermeable material of said gaseous flow comprising high concentrated carbon dioxide is carried out by means of a temperature swing adsorption (TSA) process; and
    at least one of feeding at least a portion of said gaseous flow comprising high concentrated carbon dioxide to an industrial production plant and stockpiling at least a portion of said gaseous flow comprising carbon dioxide.

2. The process according to claim 1, wherein said gas semipermeable material is able to adsorb preferentially carbon dioxide and the separation of the gaseous flow comprising high concentrated carbon dioxide from said waste gas flow comprises the steps of:
    letting a waste gas flow permeate into said gas semipermeable material in such a way to adsorb at least a relevant portion of the carbon dioxide contained within said waste gas flow and to obtain a permeated gas flow with low carbon dioxide content;
    dispersing said permeated gas flow with low carbon dioxide content; and
    deadsorbing said at least one relevant portion of carbon dioxide from said gas semipermeable material, thus obtaining said gaseous flow comprising high concentrated carbon dioxide.

3. The process according to claim 1, wherein said waste gas is produced by combustible oxidation of a fossil fuel.

4. The process according to claim 1, wherein said plant for industrial production is a plant for the production of ammonia and urea or methanol.

5. The process according to claim 2, wherein said deadsorbing step is carried out by passing through said gas semipermeable material a vapor flow or a portion of said gaseous flow comprising high concentrated carbon dioxide suitably heated at the regeneration temperature of said gas semipermeable material.

* * * * *